United States Patent [19]

Kastan

[11] 4,025,230
[45] May 24, 1977

[54] ADVANCED CONTROL SYSTEM FOR A ROTOR AND/OR A COMPOUND OR ROTARY WING VEHICLE

[75] Inventor: Howard Kastan, Northridge, Calif.
[73] Assignee: Lockheed Aircraft Corporation, Burbank, Calif.
[22] Filed: May 13, 1976
[21] Appl. No.: 686,251
[52] U.S. Cl. .............................. 416/18; 244/17.13; 244/79; 416/31; 416/114
[51] Int. Cl.² ........................................... F01D 7/00
[58] Field of Search ............ 244/17.13, 83 R, 83 G, 244/79; 416/18, 31, 114, 138

[56] References Cited
UNITED STATES PATENTS

| | | | |
|---|---|---|---|
| 2,439,089 | 4/1948 | Hodson | 416/114 |
| 2,547,721 | 4/1951 | Stalker | 416/18 |
| 2,550,538 | 4/1951 | Doman | 244/17.13 |

Primary Examiner—Trygve M. Blix
Assistant Examiner—Charles E. Frankfort
Attorney, Agent, or Firm—Billy G. Corber; Lowell G. Turner

[57] ABSTRACT

The control system includes a sensing mechanism by which a true pure signal from flapping bending activity resulting from an external load force on a rotor blade in a rotor system is generated and fed back to a gyroscope which then precesses to return a correcting feathering motion to the rotor blade through a swashplate. Such generation is developed by the sensing mechanism which comprises a cantilevered beam or spring system secured at its one end to a fixed hub arm about which the blade feathers and having its other end operatively connected to the gyroscope. The gyroscope is positioned outside of a high force blade feathering loop and is independently sized from the rotor to which it is coupled. The system also provides for pilot command input to produce a control feathering motion to a pair of blades independently of the sensing means.

15 Claims, 5 Drawing Figures

FEEDBACK MOMENT TO GYRO $= \lambda M_f \frac{r}{a}$

ADVANCED CONTROL SYSTEM FOR A ROTOR AND/OR A COMPOUND OR ROTARY WING VEHICLE

STATEMENT OF GOVERNMENT INTEREST

The invention herein described was made in the course of or under a contract or subcontract thereunder, (or grant) with the Department of the Army.

BACKGROUND OF THE INVENTION

This invention relates to a control system for a rotor, or a rotor and vehicle combination such as a helicopter or compound helicopter, and in particular to a novel and improved gyroscopically stabilized control system and apparatus therefor.

An object of this invention is to utilize a rotor blade's flapping activity, caused by commanded or uncommanded load forces thereon, for stabilizing the rotor and the vehicle itself, and for alleviation of external disturbances encountered by the rotor or rotor/vehicle combination.

Another object of this invention is to automatically and instantaneously adjust, for such uncommanded external disturbances on a rotor or rotor/vehicle combination, the pitch of the blades without requiring pilot input to provide stabilization or load alleviation of the rotor system itself or its vehicle.

A further object of this invention is to utilize the deflection inherent in a cantilevered or flapping blade itself to properly precess a gyro which controls the attitude or rate and direction of change of attitude of the rotor and/or vehicle in which the gyro is situated, by adjusting the pitch of the blades to stabilize the rotor and/or its vehicle, without the necessity of a pilot's input to the gyro to change the vehicle's attitude prior to transmitting a correcting feathering motion (pitch) to the rotor blades.

Another object of this invention is to sense a true, pure signal from a blade under an external load force and by which correction of the blade's pitch is accomplished.

A further object of this invention is to eliminate detrimental noise resulting from contamination or impurity of a feedback signal from the blade's motions and loadings and which heretofore detrimentally accompanied control systems of the involved type.

Another object of this invention is to eliminate dictation of the size of a gyroscope by the size of its associated rotor and vehicle, and thereby design an independently sized gyro for any sized rotor system or its vehicle.

Other objects and advantages will become more fully apparent and appreciated by a full and complete reading of the following description, the accompanying drawing comprising four sheets, and the claims appended thereto.

Introduction

So that the mechanic skilled in the art is properly informed in order to practice the instant invention, the following description includes reference to known prior art concept and an embodiment thereof, including drawings FIGURES which exemplifty the stabilizing and control concept and salient physical features therewith. Thereby, the description and drawing FIGURES for the instant invention will be more fully clarified, understood, and appreciated, in regard to its novelty and to its practice.

PRIOR ART

Figure 1:
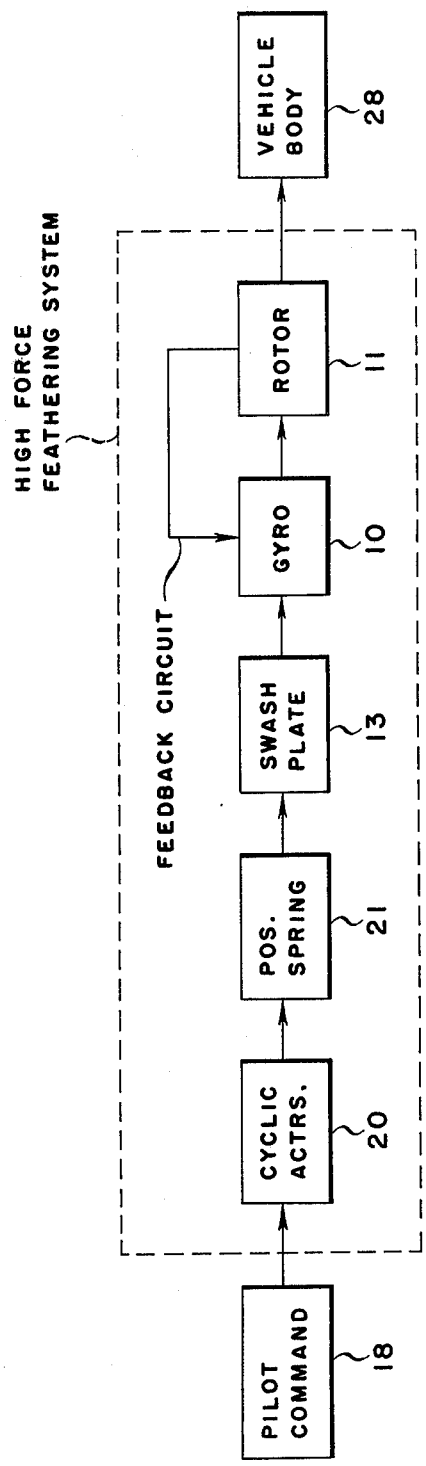
FIG. 1 is a schematic diagram of a control and stabilization system concept for a helicopter and which is known in the state of the art.
Figure 2A:
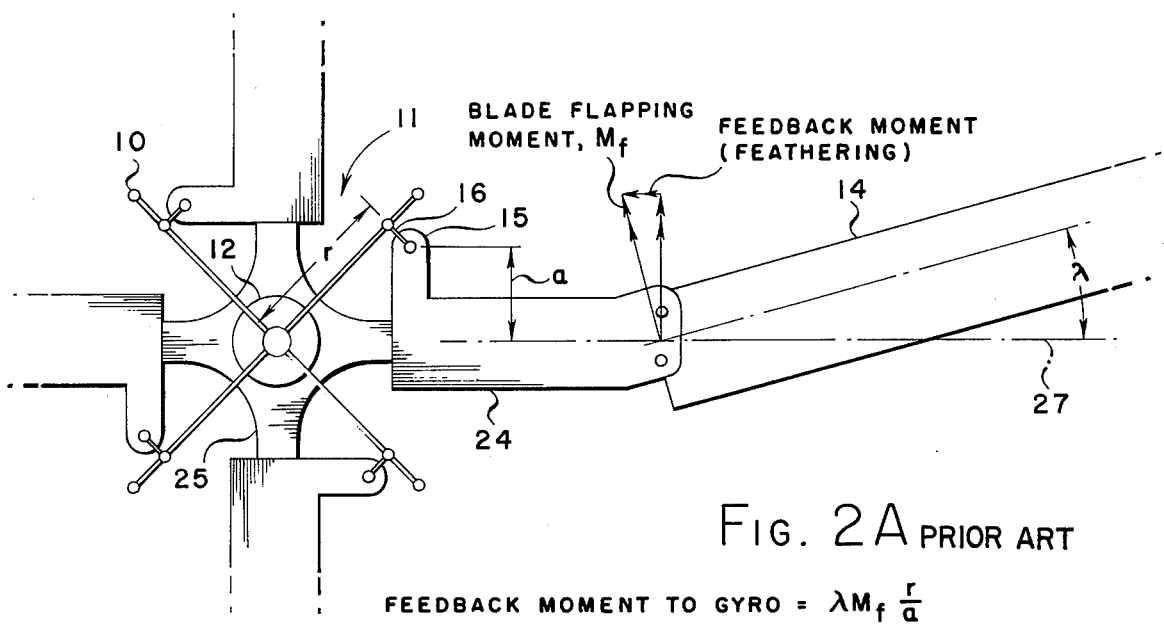
FIG. 2A and FIG. 2B are plan and perspective views of salient features of a hardware construction and arrangement of elements embodying the concept illustrated in FIG. 1.
Figure 2B:
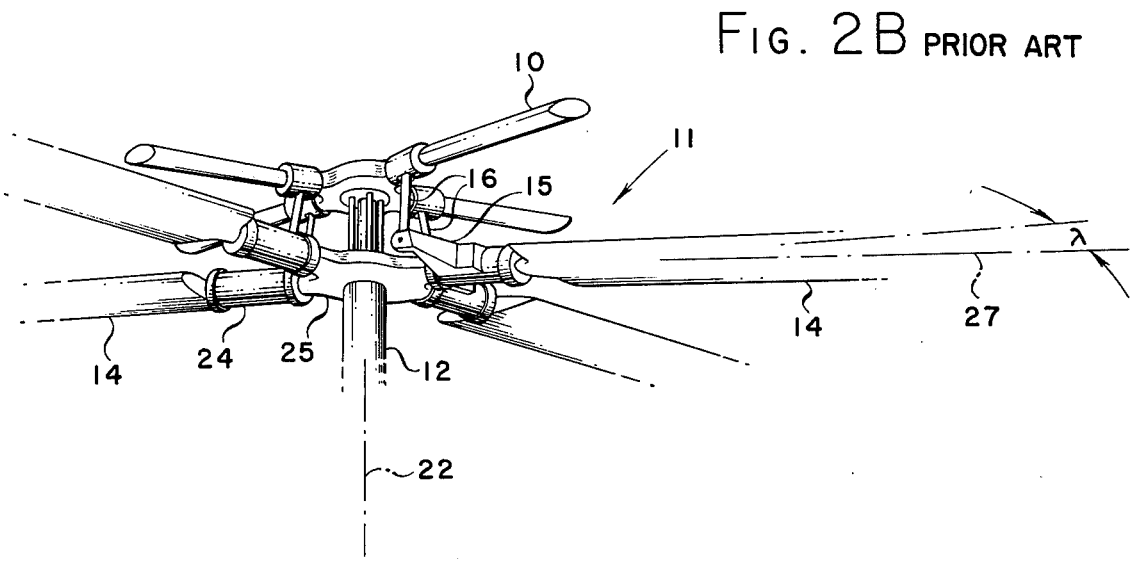

Reference to FIGS. 1, 2A, and 2B

These figures illustrate a prior art stabilizing and control system and mechanism which is known and used in current helicopters (not shown). It will be seen from FIG. 1 that a gyro 10 is positioned within what is known as a high force cyclic feathering system for the rotor 11 of such a helicopter. In the embodiment (FIGS. 2A, 2B) of such concept, the gyro 10 is mounted in known fashion atop a rotor mast 12 and operatively connected to a swashplate 13 mounted concentrically to such mast 12, such arrangement being state-of-the-art construction. It should be initially understood that this known system includes the requirements of a relatively high force which is necessary to be imposed, either by pilot command or because of external loads on the rotor blades, upon the gyro for its proper operation of the rotor cyclic feathering system. To obtain this high force, the prior art hardware included a feedback signalling circuit comprising rotor blades 14, each having a forward sweep angle λ, a pitch control arm 15 securely mounted on each rotor blade 14, and a pitch link 16 operatively connecting each of the pitch control arms 15 to the gyro 10. The gyro 10 itself is thereby operatively connected to the rotor 11, as also shown in the hardware of FIG. 2B.

When a force is generated by a pilot command 18 (FIG. 1) it is converted to impress a force on the gyro 10, through a servo-valve (not shown) to a power cyclic actuator 20 and a positive spring system 21 operative connected to the swashplate 13 which is rigidly connected to the gyro 10, in order to feather the rotor blades 14. This high force then developed is transmitted through precession of the gyro 10, to the pitch links 16 (FIG 2B), to the pitch control arms 15, and thence to the blades 14.

All of these elements excepting the pilot command are disppossed within the high force feathering system and designed to develop and transmit the required high force to the gyro 10. The gyro 10 responds by precessing in space, resulting in the gyro 10 tilted with respect to the spin axis of 22 of the rotor itself, thereby causing feathering of the blades 14 in a cyclic manner (readily discernible in FIG. 2B). In order for the gyro 10 to precess without unreasonable constraint, a negative spring system (not shown) is also incorporated between the power cyclic actuator 20 and the swashplate 13. Thus, when the gyro 10 tilts, the positive spring constraint is negated by the negative spring. When the ram of the cyclic actuator 20 moves (by pilot command 18), only the positive spring is deformed, thus applying the desired precessional moment to the gyro 10.

On the other hand, when a flapping motion of one or more rotor bades 14 occurs (this reaction inducing a load on the stabilizing and control apparatus independent from that of a pilot command 18), a signal therefrom is fed back to the gyro. As shown in FIG. 2A, the pitch control arm 15 is securely mounted to the inner end of each blade 14, such as being integrally formed on a blade cuff 24, rotatable about each hub arm 25 in conventional fashion. Each blade cuff 24, of course, is secured to its associated blade 14. A pitch link 16 operatively connects each pitch control arm 15 to a corresponding element of the gyro 10 in a conventional manner. This considers that the phasing of the feedback moment to the gyro 10 (the phasing, its mechanics and the construction of its components also being well known in the art) is such as to case the gyro 10 to tilt with respect to the rotor 11 in a direction which feathers the blades 14 to cyclically in order to oppose and remove the flapping moment which generated the feedback in the first place. The signal is measured by including a forward sweep (FIG. 2A) for each rotor blade 14 with respect to its feathering axis 27. FIGS. 2A, 2B illustrate in a exaggerated manner this forward sweep in terms of an angle $\lambda$. These two FIGURES also provide an illustration of a cranking or feathering moment for each blade 14 about its feathering axis 27. The angle $\lambda$ and the resulting moment are required to be ascertained, designed and made for a given vehicle, and such requirement is utilized as the feedback signal to the gyro 10, proportional to such a flapping motion. The cranking moment of each blade 14 is transmitted through its pitch control arm 15 and pitch link 16 to the gyro 10, thereby producing a moment on the gyro 10. The gyro 10 responds to each such moment, again by precessing. The gyro 10 tilts with respect to the spin axis of 22 of the rotor 11 in a direction that cyclically feathers the blades 14 so as to oppose and remove the flapping motion (moment) which generated the feedback signal in the first place. Thus, any external disturbance, such as a gust or ready angular or oscillatory activity of the rotor 11 and its vehicle body 28 (FIG. 1) with respect to the gryo 10, which is a stable body in space, generates both a feedback and a blade cyclic feathering reaction to damp out the effect of this detrimental activity and to thereby stabilize the system and the vehicle.

When the pilot command 18 and an external feedback signal are simultaneously impressed on the gyro 10, the intensity level and direction of imbalance produced by the resulting moments developed on the gyro 10 determine the acceleration, the rate and the direction of the desired vehicle maneuver. When the sum of the command and feedback moments on the gyro 10 are zero, the rotor 11 and vehicle will maintain direction until again perturbed, either by command or external disturbance.

It may be noted that the feathering moment equation accompanying FIG. 2A is interpreted as follows:

$\lambda$ — sweep angle in radians.

$M_f$ — blade flapping moment at intersection of blade axis and feathering axis.

r — distance (arm) from the gyro rotational axis to the pitch link attachment to the gyro.

a — distance (arm) form the blade feathering axis to the pitch link attachment to the pitch arm.

$r/a$ — a gear ratio.

Problems in Prior Art Practice

There are two fundamental constraints or disadvantages (problems) on the above described known system and apparatus and as illustrated in FIGS. 1, 2A, 2B. These constraints are overcome by the present invention, to be hereinafter described. The first constraint is noise resulting from contamination or impurity of a feedback signal from the blades' motions. Since the feedback signal is transmitted entirely within and through the high force feathering system and apparatus to the gyro, and the only valid or desired feedback signal is that generated by a 1P (one cycle per revolution) flapping of the rotor blades, which causes rotor to tilt with respect ot the mast, any other blade feathering moments constitute and contribute to noise in the feedback. The undesired or uncontrollable sources or flade feathering moments are numerous. The more important ones are:

1. Blade pitching moment variations with stall penetration: particularly on a retreating blade at a high forward speed or high "g" maneuvers; or on both advancing and retreating blades at a low speed, high lift condition.
2. Friction in the feathering bearings and pitch link bearings.
3. Mach number effects on advancing blade pitching moment characteristics at high speeds.
4. In-plane bending of the blades with the rotor coned due to lift; this action is similar to flapping bending with sweep.
5. Aerodynamic damping of blade pitching moments.
6. Reverse flow over a large span of the retreating blade at high forward speeds; the aerodynamic center of the blade is displaced from the 25% chord location to the 75% chord location under this condition.

The second constraint is size. In all known prior art devices the gyro size is related to the rotor size. This relationship is not linear; i.e., the gyro size tends to increase faster than the rotor size. This nonlinear relationship is due primarily to nonlinear growth with rotor size of the feedback noise noted above. This problem was clearly demonstrated by the developmental difficulties experienced in certain compound vehicles developed and built for the U.S. Government. In that instance the control system described above, which ahd been successfully demonstrated on relatively light vehicles, was not successful when applied to the larger, heavier vehicles.

These noted problems and disadvantage were overcome in that instance by the present invention.

DESCRIPTION OF PREFERRED EMBODIMENT

Figure 3:
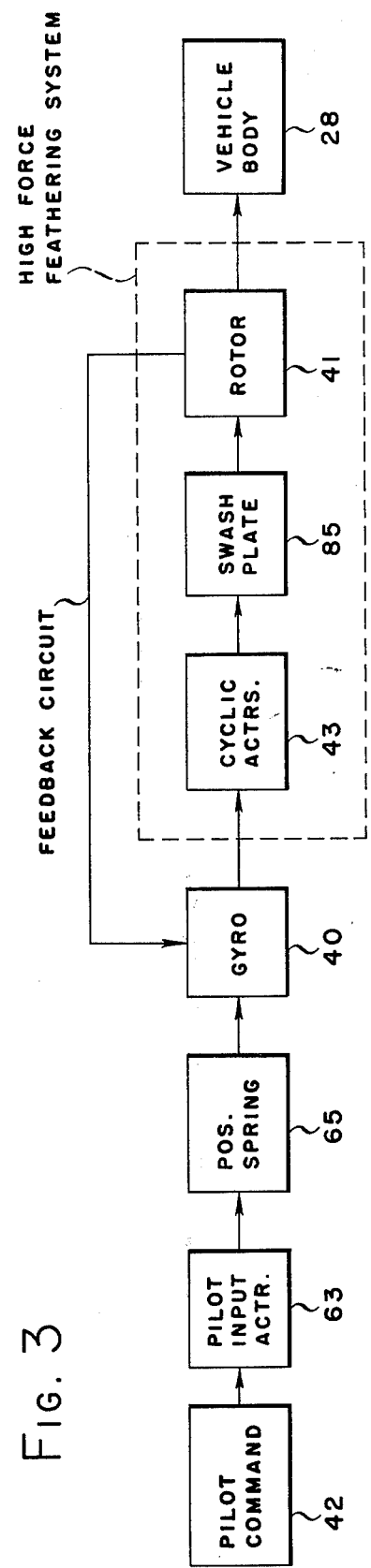
FIG. 3 is a schematic diagram of the novel control and stabilizing system concept of the instant invention.

Reference to FIG. 3.

This diagram conceptually illustrates the novel positions arrangements of the various elements of a control and stabilizing system embodying the present invention. In particular, the postition within the system of a gyro 40 is to be noted. Distinct from the described prior art, this gyro 40 is place outside of the high force cyclic feathering system for the vehicle. Thus, the generated signal from the rotor 41 to the gyro 40, as well as the gyro itself, are outside the high force cyclic feathering system for the rotor blades, in contrast to the state-of-the-art helicopters exemplified by and described above in reference to FIGS. 1, 2A, 2B. Signals which are impressed in the feedback circuit (FIG. 3) from the flapping activity of the rotor blades are taken form a non-feathering element of the rotor 41 (the fixed hub described below relative to FIG. 4) and are transmitted directly to the gyro 40. Signals from the pilot command 42 never enter the high force feathering system before being received by the gyro 40.

The gyro 40 them preccesses under the influence of these signals and transmits commands commands to the servo-valves (not shown) incorporated within cyclic power actuators 43. These power actuators 43 amplify the command of the gyro 40 to thereby feather the rotor blades, regardless of whether the command signal originates from the pilot input 42 or the rotor feedback signal. As a result of the relocation and rearrangement within the system of the gyro 40 and its accompanying feedback cirucit, certain significant advantages occur. The size of the gyro 40 is longer essentially relataed to the rotor size, since the gyro 40 now commands the cyclic feathering for the rotor blades through an amplifier (the cyclic actuators 43), which is adjustable to the size of the rotor 41. Further, the disassociation of the gyro 40 from the blade feathering system provides for a feedback sensing means (46 in FIG. 4) which senses true blade flapping only and which eliminates any significant detrimental noise in the feedback signal to the gyro 40. Additionally, and again in contrast to the prior systems, the gyro 40 is entirely removed from the blade collective feathering control system. Thus, such disassociation of the gyro 40 provides for independent desgin and tailoring between the collective and cyclic control elements.

Figure 4:
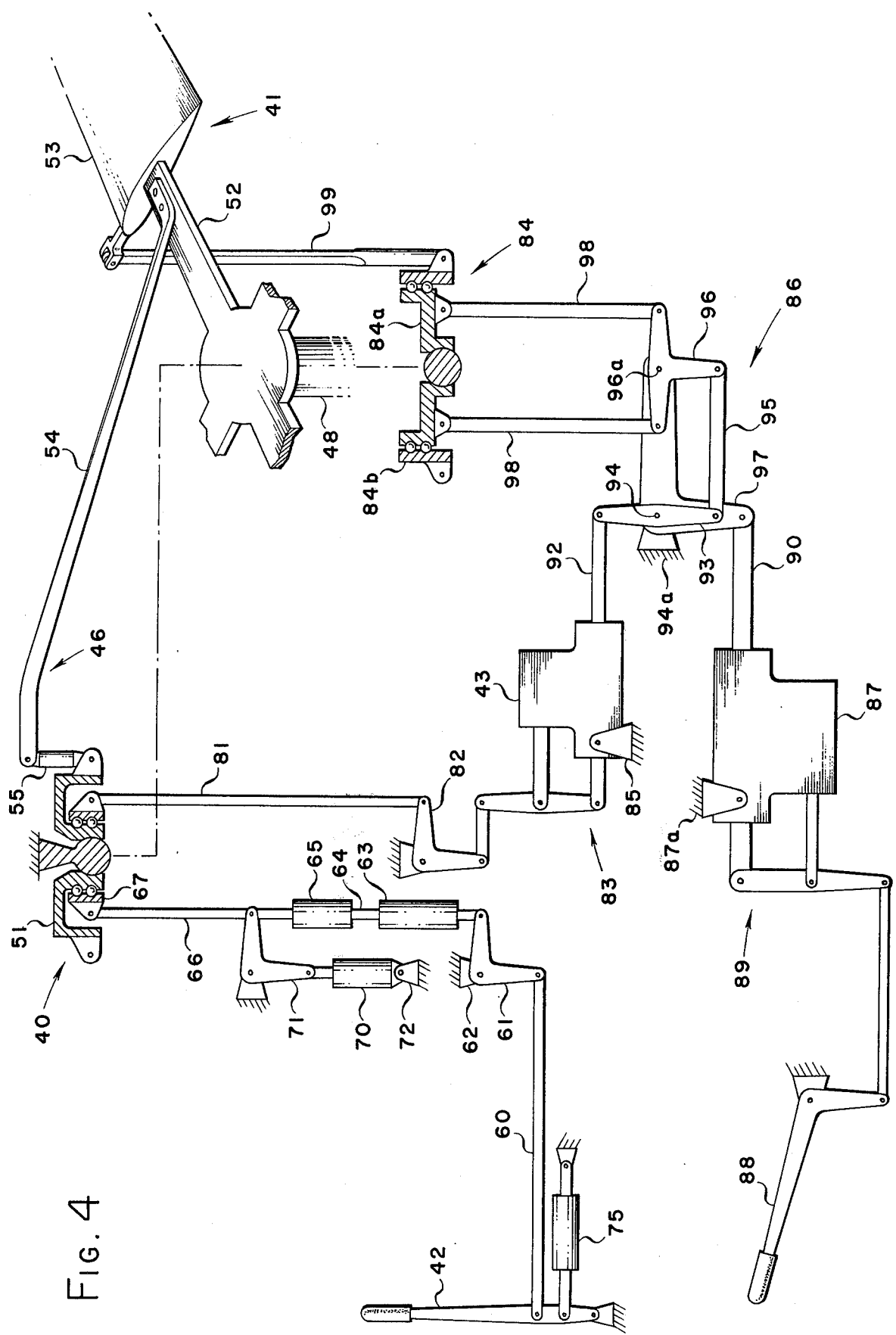
FIG. 4 illustrates a reduction to practice of the concept schematically shown in FIG. 3.

Reference to FIG. 4

FIG. 4 illustrates a reduction to practice of the concept visualized by FIG. 3.

The control and stability system illustrated in FIG. 4 utilizes a relatively small rotor-speed gyroscope 40. As described in relation to FIG. 3, it is located outside of the high force loop. It is suitably mounted around the mast 48 of the rotor 41, such as by suitable bearings (not shown) on a non-rotating gimbal member (not shown) secured to frame structure of the vehicle body. A sensing means 46 operatively connects the rotatable portion 51 of the gyro 40 to a non-feathering element such as a hub or fixed hub arm 52 for each of the rotor blades 53. This sensing means 46 is illustrated in FIG. 4 as a simple cantilevered beam assembly comprising a feedback arm 54 ridgidly attached at its outboard end to the fixed hub arm 52, and attached at its inboard end to the rotatable portion 51 of the gyro 40 through a spring element 55. Thus, the sensing means 46 measures cyclic blade flapping directly, by means of a proportional flapping bending motion of the fixed hub arm 52, rather than as a feathering component of blade flapping moment along a swept axis (resolved through a sweep angle.) A sweep for the blade, then, as shown in FIGS. 2A, 2B, is not required for a feedback signal, and its sweep angle may be set to zero or any position desired for other considerations.

Each sensing means 46 may be mechanical, electrical, or hydraulic. Its important characteristic is its ability to transimit a true, pure signal (flapping bending of element 52) to the gyro 40, i.e., an integrated cyclic asymmetric flapping signal, without contamination or impurity of the signal, as is the case with prior art systems an example of which was described above.

In regard to inner end of the cantilever beam 54, it is attached to the top of the spring 55, so that motions of the cantilever beam extend or compress the spring 55, thereby changing the force in the spring proportionally to the flapping bending motion of the hub arm 52. The bottom of the spring 55 is attached to the rotatable portion of the gyro 51, thereby transducing hub flapping activity into proportional precessional moment on the gyro 40.

A cyclic control input from the pilot's command 42 (FIG. 3) is transmitted to the gyro 40 through suitable and known mechanisms, springs, and linkages all mounted and connected in known fashion. For illustrative purposes (FIG. 4), a rod 60 connects the pilot's stick (command) 42 to one end of a bellcrank 61 pivotably mounted upon a structural frame member 62 of the vehicle. A pilot's input cyclic servoactuator 63 is operatively connected to the other end of the bellcrank 61. The ram 64 of the actuator 63 is operatively connected to a positive spring member 65 which in turn is operatively connected through a rod 66 to a non-rotatable portion 67 of the gyro 40. The positive spring member 65 is connected to the gyro 40 so as to affect the latter's movement about the roll axis for the vehicle. A second positive spring member (not shown) and accompanying actuator (not shown) are suitably disposed and mounted in like and known fashion between the pilot's stick 42 and the gyro 40 in a like operative manner, and they affect the gyro's movement about the pitch axis of the vehicle. However, for clarity of illustration of FIG. 4, such a well known actuator and spring assembly and its known connections have been omitted.

A negative spring assembly 70 is conventionally incorporated for the purpose of assuring unconstrained precessional motion of the gyro 40 when it is subject to moments form the pilot's command and/or the feedback system. The positive spring constraints to gyro precesion, 55 and 65, are balanced by the negative springs 70. There is one such assembly 70 for each of the positive spring assemblies 65. The movment or action of each of the rods 66 reacts through a pivotably mounted and connected bellcrank member 71 to the corresponding negative spring assembly 70 which is grounded to frame structure, as at 72.

The assemblies 55, 65, and 70 also serve the purpose of tuning the gyro to the desired precessional frequency, such tuning and its purpose being well known in the art.

A conventional 'feel spring' assembly 75, not part of this invention, is provided for the pilot to assist in obtaining a good feel for operation of the invention.

The incorporated servo-valve of each of a pair of cyclic-feathering servo-actuators 43 is operatively connected to the gyro 40 by means of a rod 81, a bellcrank 82 pivotable about frame structure 82a, and an assembly of levers 83 attached to the interior working elements (not shown) of its associated actuator 43. FIG. 4 illustrates, for purposes of clarity, only of such actuators 43 and which corresponds to, say, the roll axis for the vehicle. The other (not shown) of such actuators 43 is disposed on the pitch axis for the vehicle and is operatively connected in like manner to the gyro 40. These cyclic actuators 43 furnish sufficient force to feather the rotor blades 53 cyclically in proportion to the precessional movemement of the gyro 40.

The forces and motions of the cyclic actuators are transmitted through additional mechanisms, including a swashplate 84 which is provided to feather the rotor blades 53. The actuators 43 are suitably mounted upon frame structure, as at 85.

Each of the cyclic actuators 43 is operatively connected to the swashplate 84 through a combination of linkages, bellcranks and rods indicated generally by the numeral 86 and sometimes referred to as mixer mechanism. This mixer mechanism 86 provides for a resultant action developed from the outputs of the cyclic feathering servo actuator 43 and a collective feathering servo actuator 87, this action being then transmitted to the swashplate 84.

Again, it should be understood that while only a single cyclic actuator 43 is illustrated, both cyclic actuators (pitch and roll) are operatively connected to the mixer mechanism 86 in a manner well known in the art.

A collective feathering servo-actuator 87 is also provided; however, the description in this specification will be limited to its operative connection to the above-descirbed mixer mechanism 86, as it is not part of the invention. Additionally, it is a well known component in the helicopter art. Mounted to frame structure 87a, it serves in the practice of this invention its customary purpose and function of feathering all rotor blades 53 equally and simultaneously. It is operated by means of a second independent pilot's stick 88 which is connected to it in the usual manner, i.e., by means of a rod-and-lever-linkage mechanism 89, so as to produce an output through its ram 90.

The ram 92 of each cyclic actuator 43 is pivotally attached to one end of a lever member 93 fulcrumed as at 94 to vehicle frame structure 94a. The other end of the lever member 93 is pivotally attached to one end of a link 95, the other end of which is pivotally attached to the free end of double bellcrank member 96. The ram 90 of the collective feathering servo-actuator 87 is pivotally attached to one end of a single bellcrank member 97, which is also pivotally mounted about the fulcrum 94. The other end of the single bellcrank member 97 is pivotally attached to the pivot point 96a for the double bellcrank member 96. A pair of rods 98 are, in turn, pivotally attached to the opposing ends of the double bellcrank member 96, and have their other ends pivotally attached to the non-rotatable portion 84a of the swashplate 84.

The swashplate 84 is concentrically mounted about the same axis as the rotor mast 48, however, the tilt axis for the swashplate 84 is not restricted or constrained in relation to the precessional axis of the gyro 40, as does occur in prior art systems. This particular feature of non-restriction provides an additional parameter for gyro-to-rotor phasing.

Each rotor blade 53 is operatively connected to the swashplate 84 by means for a linking rod 99. One end of the rod 99 is pivotally connected to the blade 53 and its other, end is pivotally attached to a rotatable portion 84b of the swashplate 84. This particular connection arrangement of blades and swashplate is state-of-the-art desgin and construction.

Operation

In operation, cyclic feathering of rotor blades 53 occurs either by a pilot command 42 or by the feedback sensing means 46 triggered by the cyclic flapping activity of the blades, or by a combination of these signals generated by the pilot command 42 and feedback sensing means 46.

BY PILOT COMMAND

In this instance, it is desired that the position of the swashplae 84 be changed in a controlled, manner to cause the linking rod 99 to displace so as to produce a cyclic feathering of the blades 53 in the desired amount and direction.

Movement of the pilot's stick 42 is transmitted through the rod 60, turning the bell crank 61 about its fulcrum and thereby imposing a force on the rod 66, by displacement of the lower end of the positive spring 65 through the actuator 63 and rod 64. The gyro 40 reacts to the rod's force, precessing in the desired direction in accordance with recognized principles so as to transmit its motion through the rod or rods 81, the bellcrank(s) 82, and the lever assembly 83 to either or both of the servo-valves incorporated within the cyclic actuators 43. The ram or rams 92 are displaced by the actuator(s) 43 so as to turn the lever 93, pulling or pushing the rod 95 attached to the free end of the double bellcrank member 96. The direction of the movement of the member 96 translates into displacement of the rod or rods 98 linking together the member 96 and the swashplate 84. The subsequent motion of the swashplate 84 then, is transmitted to the blades 53 through the pitch links 99.

BY IMPOSED LOAD ON THE BLADE

Should a load be imposed upon a blade 53, a direct measurement of its effect on the blade is inherent in the flapping bending motion of the particular fixed hub arm 52 associated with the blade which flaps. Such bending is translated into a signal which is returned to the gyro 40. This signal is transferred from the deflected hub arm 52 to its feedback arm 54 and thence through the feedback spring 55, via the intermediate linkage, as a force to the gyro 40. The gyro 40 precesses in accordance with the signal (force) impressed upon it, so as to provide a motion output which is then transmitted therefrom through rod(s) 81, etc., to the servo-valves of the involved cyclic actuator(s) 43. The cyclic actuator(s) 43 then transmits its (their) output to the swashplate 84 in the manner explained above in regard to the operation by the pilot command 42. The swashplate 84 reacts accordingly and thereby causes the desired feathering of the blade(s) 53 to remove such undesired load. This is accomplished without the necessity of changing the attitude of the vehicle which, with this described controlling system and apparatus, remains stabilized.

Although the sensing means 46, as illustrataed, is in the form of a rigid cantilevered beam and a spring, other sensing arrangments are also contemplated as being within the scope and spirit of this invention. For example, a flexible cantilever beam can be utilized as a spring rather than the illustrataed combination of a rigid cantilevered beam and spring. The term "sensing" is to be understood to include any means — mechanical, electrical, hydraulic — which senses a true pure signal from the flapping bending (activity) òf a rotor blade and transmits a proportionate precessional moment to gyroscopic means.

It should now be apparent that the initially discussed difficulties and disadvantages are eliminated because the rotor signals the gyro by means of a true measurement of a flapping moment and not by a feathering moment. Also, the placement of the gyro in a low force system, out of the high force loop in which it had previously been positioned between the feathering servo-actuator output and the blade, enables the use of a (small) gyro which is now independently sized from the rotor.

The disclosed system shown may be applied to articulated, gimballed, flapping, teetering and other rotors as well as rigid rotors, to provide the desired inherent stability for the vehicle.

This disclosed system may also be applied to a windmill in order to keep the rotor lined up with the wind and for purposes of transient load alleviation and rotational speed control.

Pursuant to the requirements of the patent statutes, this invention and its principal have been disclosed, explained and exemplified in a manner so that the invention can be readily practiced by those skilled in the art to which it pertains. However, it shoud be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:

1. A sensing means which feeds back to a gyroscope a true signal from flapping bending activity of a rotor blade, the gyroscope then returning a correcting feathering motion to the rotor blade,
   said sensing means including one end element for measurement of pure flapping motion of a fixed hub arm to which the rotor blade is secured and a second end adapted for operative connection to the gyroscope.

2. The sensing means of claim 1 comprising an assembly
   including a cantilevered beam having one end being said end element securely attached to the fixed hub arm, its other end being the second end adapted for operative connection to the gyroscope.

3. The sensing means of claim 2 including a feedback spring having its one end operatively connected to the second end of said cantilevered beam and the other end of said feedback spring being operatively connected to the gyroscope.

4. The sensing means of claim 3 in combination with a compound or rotary wing vehicle.

5. A control apparatus for a rotar system comprising in combination,
   a rotor including fixed hub arms and a rotor blade featherably attached to each of said hub arms,
   swashplate means operatively connected to said rotor,
   cyclic actuator means operatively connected to said swashplate means,
   gyroscopic means operatively connected to said cyclic actuator means, and
   a sensing means connecting said rotor to said gyroscopic means,
   whereby a signal proportional to flapping bending activity undergone by said rotor blade as a result of an external load force on said rotor blade is fed through said sensing means to said gyroscopic means which then precesses to return a correcting feathering motion to said rotor blade through said cyclic actuator means and swashplate means.

6. The control apparatus of claim 5 including a pilot command input means to said gyroscopic means rather than to said swashplate means,
   whereby a command feathering motion to said rotor is effected in a controlled manner from said pilot command inputs means.

7. The control apparatus of claim 5 wherein said sensing means includes an end element for measurement of pure flapping motion of each of said hub arms and also having a second end for operative connection to said gyroscopic means.

8. The control apparatus of claim 7 wherein said sensing means comprises an assembly including a cantilevered beam its one end being said end element securely attached to each of said hub arms, the other end of said cantilevered beam being said second end for operative connection to said gyroscopic means.

9. The control apparatus of claim 8 including a feedback spring having its one end operatively connected to said second end of said cantilevered beam and the other end of said feedback spring being operatively connected to said gyroscopic means.

10. A vehicle having a mechanism for controlling and stabilizing said vehicle and a rotor system therein, said rotor system having fixed hub arms and a rotor blade featherably mounted to each of said hub arms, and comprising in combination.
    swashplate means operatively connected to said rotor blade,
    gyroscopic means operatively connected to said swashplate means, and
    a sensing means operatively connected to said gyroscopic means and including an end element for measurement of pure flapping motion of said hub arms, said sensing means feeding back a signal proportional to the flapping bending activity undergone by said rotor blade as a result of an external load force on said rotor blade, said gyroscopic means then precessing to return a correcting feathering motion to said rotor blade through said swashplate means.

11. The vehicle of claim 10 wherein said sensing means comprises an assembly including a cantilevered beam having said end element and having a second end being operatively connected to said gyroscopic means.

12. The vehicle of claim 11 including a feedback spring
    having its one end operatively connected to said second end of said cantilevered beam and the other end of said feedback spring being operatively connected to said gyroscopic means.

13. In an apparatus for controlling and stabilizing a rotor system having a rotor comprising fixed hub arms and a rotor blade featherably mounted to each of said fixed hub arms, swashplate means operatively connected to said rotor blade, cyclic actuator means operatively connected to said swashplate means, and gyroscopic means operatively connected to said swashplate means,
    the improvement comprising
    a sensing means for feeding back a signal proportional to the flapping bending activity undergone by said rotor blade as a result of an external load force on said rotor blade operatively connecting each of said fixed hub arms to said gyroscopic means which then precesses to return a correcting feathering motion to said rotor blade through said swashplate means.

14. In the apparatus of claim 13, said sensing means comprising an assembly including a cantilevered beam having its one end securely attached to each of said fixed hub arms, the other end of said beam being operatively connected to said gyroscopic means.

15. The improvement of claim 13 in combination with a vehicle in which the apparatus is mounted.

* * * * *